United States Patent
Takata

(10) Patent No.: US 9,978,352 B2
(45) Date of Patent: May 22, 2018

(54) ACOUSTIC INSULATOR AND WIRING HARNESS WITH ACOUSTIC INSULATOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yutaka Takata, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/109,830

(22) PCT Filed: Jan. 8, 2015

(86) PCT No.: PCT/JP2015/050322
§ 371 (c)(1),
(2) Date: Jul. 6, 2016

(87) PCT Pub. No.: WO2015/115143
PCT Pub. Date: Aug. 6, 2015

(65) Prior Publication Data
US 2016/0329039 A1 Nov. 10, 2016

(30) Foreign Application Priority Data
Jan. 29, 2014 (JP) .................................. 2014-014204

(51) Int. Cl.
*G10K 11/168* (2006.01)
*B60R 13/08* (2006.01)
(Continued)

(52) U.S. Cl.
CPC ............ *G10K 11/168* (2013.01); *B32B 5/022* (2013.01); *B32B 5/22* (2013.01); *B32B 5/24* (2013.01);
(Continued)

(58) Field of Classification Search
CPC .... G10K 11/16; G10K 11/162; G10K 11/168; B60R 16/02; B60R 13/02; B60R 13/08;
(Continued)

(56) References Cited

U.S. PATENT DOCUMENTS 6,000,959 A * 12/1999 Curtindale .......... B60R 16/0207
439/246
8,393,438 B2 * 3/2013 Ogawa ...................... B32B 5/26
181/286

(Continued)

FOREIGN PATENT DOCUMENTS

JP 2007-86505 4/2007
JP 2011-84855 4/2011

(Continued)

OTHER PUBLICATIONS

Jp 2011084855TRANS printed on Mar. 2017.*
International Search Report.

*Primary Examiner* — Edgardo San Martin
(74) *Attorney, Agent, or Firm* — Gerald E. Hespos; Michael J. Porco; Matthew T. Hespos

(57) ABSTRACT

An acoustic insulator for a wiring harness has a non-woven fabric laminate in which non-woven fabrics are laminated. The non-woven fabrics include a skin material non-woven fabric and a base material non-woven fabric having a larger basis weight than the skin material non-woven fabric. At least the base material non-woven fabric includes a first base material non-woven fabric (31) and a second base material non-woven fabric (32). An acoustic insulator (1) is formed by arranging the skin material non-woven fabric (2) between (Continued)

the first and second base material non-woven fabrics (31, 32), and the acoustic insulator (1) is integrated with a wiring harness (7) to form a wiring harness with acoustic insulator (6).

4 Claims, 8 Drawing Sheets

(51) Int. Cl.
  *B32B 5/26* (2006.01)
  *B32B 5/02* (2006.01)
  *B32B 5/22* (2006.01)
  *B32B 5/24* (2006.01)
  *B60R 16/02* (2006.01)
  *G10K 11/162* (2006.01)
(52) U.S. Cl.
  CPC ............ *B32B 5/26* (2013.01); *B60R 13/0846* (2013.01); *B60R 16/0207* (2013.01); *B32B 2262/0246* (2013.01); *B32B 2262/0253* (2013.01); *B32B 2262/0261* (2013.01); *B32B 2262/0276* (2013.01); *B32B 2262/0284* (2013.01); *B32B 2262/04* (2013.01); *B32B 2262/06* (2013.01); *B32B 2262/101* (2013.01); *B32B 2307/102* (2013.01); *B32B 2457/00* (2013.01)
(58) Field of Classification Search
  CPC .. B32B 5/26; B32B 5/022; B32B 7/02; D04H 1/46; D04H 1/42; D04H 1/54
  USPC .................................. 181/290, 294, 286, 204
  See application file for complete search history.

(56) References Cited

U.S. PATENT DOCUMENTS

| | | | | |
|---|---|---|---|---|
| 8,695,757 | B2* | 4/2014 | Duval | B32B 5/22 181/286 |
| 9,505,359 | B2* | 11/2016 | Takata | B32B 5/022 |
| 9,570,061 | B2* | 2/2017 | Takata | B32B 5/26 |
| 2006/0021823 | A1* | 2/2006 | Kohara | B32B 5/24 181/290 |
| 2006/0225952 | A1* | 10/2006 | Takayasu | G10K 11/162 181/294 |
| 2014/0027200 | A1* | 1/2014 | Mori | G10K 11/168 181/294 |
| 2015/0203058 | A1* | 7/2015 | Osada | B60R 13/0243 307/9.1 |
| 2015/0232044 | A1* | 8/2015 | Demo | B60R 13/08 181/290 |
| 2017/0012416 | A1* | 1/2017 | Takata | B32B 5/022 |

FOREIGN PATENT DOCUMENTS

| | | | | |
|---|---|---|---|---|
| JP | 2011084855 A | * | 4/2011 | |
| JP | 2013-71533 | | 4/2013 | |
| WO | WO 2016052150 A1 | * | 4/2016 | ............. B60R 13/08 |
| WO | WO 2016121467 A1 | * | 8/2016 | ............... B32B 5/26 |

* cited by examiner

ACOUSTIC INSULATOR AND WIRING HARNESS WITH ACOUSTIC INSULATOR

BACKGROUND

1. Field of the Invention

The present invention relates to an acoustic insulator using non-woven fabrics and a wiring harness with acoustic insulator in which an acoustic insulator and a wiring harness are integrated.

2. Description of the Related Art

Normally, acoustic absorbers are provided to enhance indoor silence for the interior of automotive vehicles, houses and the like. Conventionally, glass wool, rock wool, porous ceramics, waste cotton and the like have been used as acoustic absorbers. Further, in recent years, an acoustic absorbing/insulating material has been proposed in which a substantially non-porous sheet made of thermoplastic elastomer or the like and an acoustic absorber made of non-woven fabrics are laminated (see Japanese Unexamined Patent Publication No. 2007-86505).

Particularly in vehicles, such as automotive vehicles, it is desirable to make an indoor environment comfortable by cutting outside noise and improving indoor silence. Thus, an acoustic insulator excellent in acoustic insulation performance is required besides a conventional acoustic absorber having acoustic absorption performance.

The present invention is designed to solve the above problem of the conventional technology and aims to provide an acoustic insulator and a wiring harness with acoustic insulator excellent in acoustic insulation performance.

SUMMARY

An acoustic insulator of the present invention is composed of a non-woven fabric laminate in which non-woven fabrics are laminated. The non-woven fabrics include a skin material non-woven fabric and a base material non-woven fabric having a larger basis weight than the skin material non-woven fabric. At least the base material non-woven fabric includes a first base material non-woven fabric and a second base material non-woven fabric and the skin material non-woven fabric is arranged between the first and second base material non-woven fabrics.

In the above acoustic insulator, another skin material non-woven fabric different from the skin material non-woven fabric may be provided at least on one outermost surface of the non-woven fabric laminate.

In the above acoustic insulator, the basis weight of the skin material non-woven fabric may be in a range of 10 to 100 g/m2 and the basis weight of the base material non-woven fabric may be in a range of 100 to 600 g/m2.

The above acoustic insulator and a wiring harness may be integrated.

In the above wiring harness with acoustic insulator, the acoustic insulator and the wiring harness may be integrated with the wiring harness sandwiched between the plurality of non-woven fabrics.

The acoustic insulator of the present invention may be composed of the non-woven fabric laminate in which the plurality of non-woven fabrics are laminated. The non-woven fabrics may include the skin material non-woven fabric and the base material non-woven fabric having a larger basis weight than the skin material non-woven fabric. At least the base material non-woven fabric includes the first base material non-woven fabric and the second base material non-woven fabric and the skin material non-woven fabric is arranged between the first and second base material non-woven fabrics. Thus, sound in a wide frequency range from a low frequency to a high frequency can be cut off.

The wiring harness with acoustic insulator of the present invention is formed by integrating the above acoustic insulator and the wiring harness. Thus, time and labor for mounting the acoustic insulator capable of cutting off sound in a wide frequency range from a low frequency to a high frequency separately from the wiring harness can be saved.

DETAILED DESCRIPTION

Figure 1:
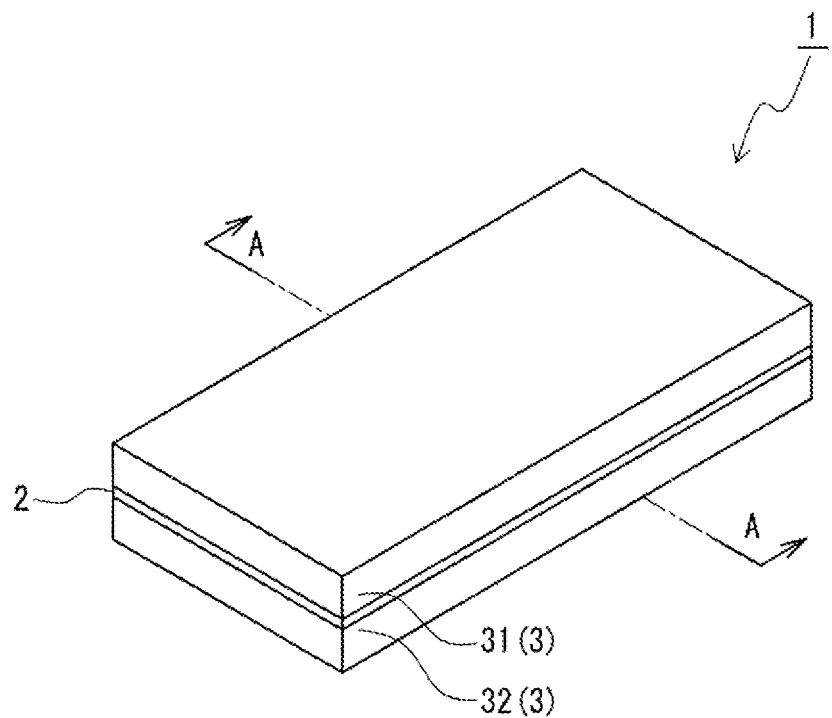
FIG. 1 is an external perspective view showing an example of an acoustic insulator of the present invention.
Figure 2:
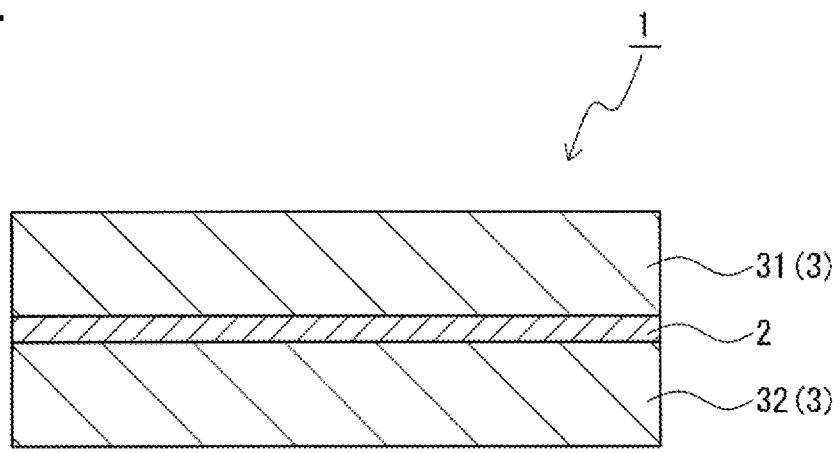
FIG. 2 is a vertical section along A-A of FIG. 1.

Hereinafter, an embodiment of the present invention is described in detail using the drawings. FIG. 1 is an external perspective view showing an example of an acoustic insulator of the present invention and FIG. 2 is a vertical section along A-A of FIG. 1. An acoustic insulator 1 shown in FIGS. 1 and 2 is composed of a non-woven fabric laminate in which a plurality of non-woven fabrics are laminated.

As shown in FIGS. 1 and 2, the acoustic insulator 1 includes a skin material non-woven fabric 2 and base material non-woven fabrics 3 having a larger basis weight than the skin material non-woven fabric 2. Two non-woven fabrics, i.e. a first base material non-woven fabric 31 and a second base material non-woven fabric 32 are used as the base material non-woven fabrics 3. The skin material non-woven fabric 2 is arranged between the first and second base material non-woven fabrics 31, 32.

The base material non-woven fabric 3 such as the first or second base material non-woven fabric 31, 32 is formed to have a larger basis weight than the skin material non-woven fabric 2. In the acoustic insulator of FIG. 1, the base material non-woven fabrics 3 having the same configuration were used as the first and second base material non-woven fabrics 31, 32. The basis weights of the first and second base material non-woven fabrics 31, 32 may be equal as just described, but may also be different. If the basis weights of the first and second base material non-woven fabrics 31, 32 are different, the base material non-woven fabric having a smaller basis weight has only to have a larger basis weight than the skin material non-woven fabric 2.

Excellent acoustic insulation performance is obtained by a configuration in which the base material non-woven fabrics 3 (31, 32) and the skin material non-woven fabric 2 have different basis weights and the skin material non-woven fabric 2 is arranged between the base material non-woven fabrics 3.

The respective non-woven fabrics constituting the acoustic insulator may be merely placed one over another or may be integrated by thermal fusion, bonding or the like. Preferably, thermal fusion, needle punching or the like is adopted.

Further, the non-woven fabrics may adhere to each other or slight spaces may be provided between the non-woven fabrics.

Figure 3:
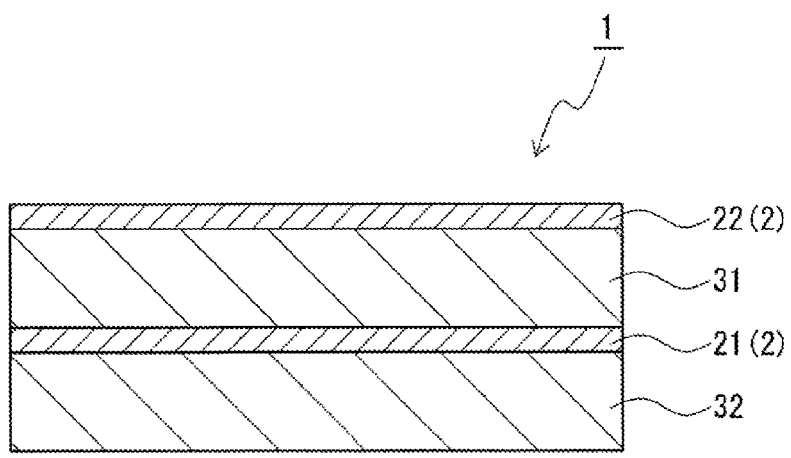
FIG. 3 is a section showing another mode of the acoustic insulator of the present invention.

FIG. 3 is a section showing another example of the acoustic insulator of the present invention. As shown in FIG. 3, the acoustic insulator 1 may be configured to further include another skin material non-woven fabric 2 (second skin material non-woven fabric 22) different from the skin material non-woven fabric 21 (first skin material non-woven fabric 21) on an outermost surface of the non-woven fabric laminate in which the first base material non-woven fabric 31, the first skin material non-woven fabric 21 and the second base material non-woven fabric 32 shown in FIG. 2 are successively laminated.

The skin material non-woven fabric 2 on the outermost surface of the non-woven fabric laminate may be provided on only one outermost surface of the acoustic insulator 1 as shown in FIG. 3, but may be provided on one and the other outermost surfaces of the acoustic insulator so that the skin material non-woven fabrics are provided on the opposite outer surfaces of the acoustic insulator 1 although not particularly shown.

In the case of providing the second skin material non-woven fabric 22 only on one outermost surface of the non-woven fabric laminate, the second skin material non-woven fabric 22 may be provided on a surface of the first base material non-woven fabric 31 as shown in FIG. 3, but may be provided on a surface of the second base material non-woven fabric 32 although not particularly shown.

If the acoustic insulator 1 includes the second skin material non-woven fabric 22 on the outermost surface of the non-woven fabric laminate as shown in FIG. 3, a better acoustic insulation effect is achieved as compared to the acoustic insulator shown in FIG. 1.

A basis weight of the skin material non-woven fabric 2 is preferably in a range of 10 to 100 g/m2. If the basis weight of the skin material non-woven fabric 2 is excessively large, it may become difficult to obtain the acoustic insulation effect as a skin material. If the basis weight of the skin material non-woven fabric 2 is excessively small, the acoustic insulation effect of the skin material may not be sufficiently exhibited.

A thickness of the skin material non-woven fabric 2 is preferably in a range of 0.1 to 3 mm. If the skin material non-woven fabric 2 is excessively thick, it may become difficult to obtain the acoustic insulation effect of the skin material non-woven fabric 2. If the skin material non-woven fabric 2 is excessively thin, the acoustic insulation effect of the skin material non-woven fabric 2 may not be exhibited.

A fiber diameter of fibers used in the skin material non-woven fabric 2 is preferably in a range of 1 to 50 μm. If the fiber diameter is excessively small, the acoustic insulation performance may be high, but the material may become brittle. Further, if the fiber diameter is excessively large, the acoustic insulation effect of the skin material non-woven fabric 2 may not be exhibited.

The shape of the fibers used in the skin material non-woven fabric 2 may be of a core-sheath type, a cylindrical type, a hollow type or a side-by-side type or fibers having a modified cross-section different in shape from normal fibers may be used. The fibers used in the skin material non-woven fabric 2 may be either short fibers or long fibers.

Examples of the base material of the fibers of the skin material non-woven fabric 2 include polyesters such as polyethylene terephthalate and polybutylene terephthalate, polyolefin, nylon, polyamide, polyvinyl chloride, rayon, acryl, acrylonitrile, cellulose, kenaf and glass.

A non-woven fabric produced by needle punching, spun bonding, spun lacing, melt blowing or the like can be used as the skin material non-woven fabric 2.

A basis weight of the base material non-woven fabric 3 is preferably in a range of 100 to 600 g/m2. There is a tendency that an acoustic insulation rate is high if the basis weight of the base material non-woven fabric 3 is large and the acoustic insulation rate is low if the basis weight is small.

Further, a thickness of the base material non-woven fabric 3 is preferably in a range of 5 to 40 mm.

Further, a fiber diameter of fibers used in the base material non-woven fabric 3 is preferably in a range of 9 to 100 μm. There is a tendency that the acoustic insulation performance is high if the fiber diameter of the fibers used in the base material non-woven fabric 3 is small and the acoustic insulation performance is low if the fiber diameter is large.

The shape of the fibers used in the base material non-woven fabric 3 may be of a core-sheath type, a cylindrical type, a hollow type or a side-by-side type or fibers having a modified cross-section different in shape from normal fibers may be used. The fibers used in the base material non-woven fabric 3 may be either short fibers or long fibers.

Examples of the base material of the fibers of the base material non-woven fabric 3 include polyesters such as polyethylene terephthalate and polybutylene terephthalate, polyolefin, nylon, polyamide, polyvinyl chloride, rayon, acryl, acrylonitrile, cellulose, kenaf and glass.

A non-woven fabric produced by needle punching, spun bonding, spun lacing, melt blowing or the like can be used as the base material non-woven fabric 3.

The basis weight of each non-woven fabric constituting the skin material non-woven fabric 2 or the base material non-woven fabric 3 can be appropriately selected according to the acoustic insulation performance or the like.

In the case of installing the acoustic insulator 1 in a vehicle or the like, the skin material non-woven fabric 2 arranged closest to a sound source side is preferably configured to have a highest density. This is because sound incident on the acoustic insulator 1 and reflected inside can be prevented from coming out again toward the sound source side through the skin material non-woven fabric 2.

A density of a non-woven fabric is an apparent density (bulk density) and can be obtained from the values of a basis weight and a thickness. The basis weight can be measured using a test method of JIS L1913 for obtaining a mass per unit area. Further, a thickness at the time of pressing at a pressure of 0.1 kPa can be used.

Figure 4:
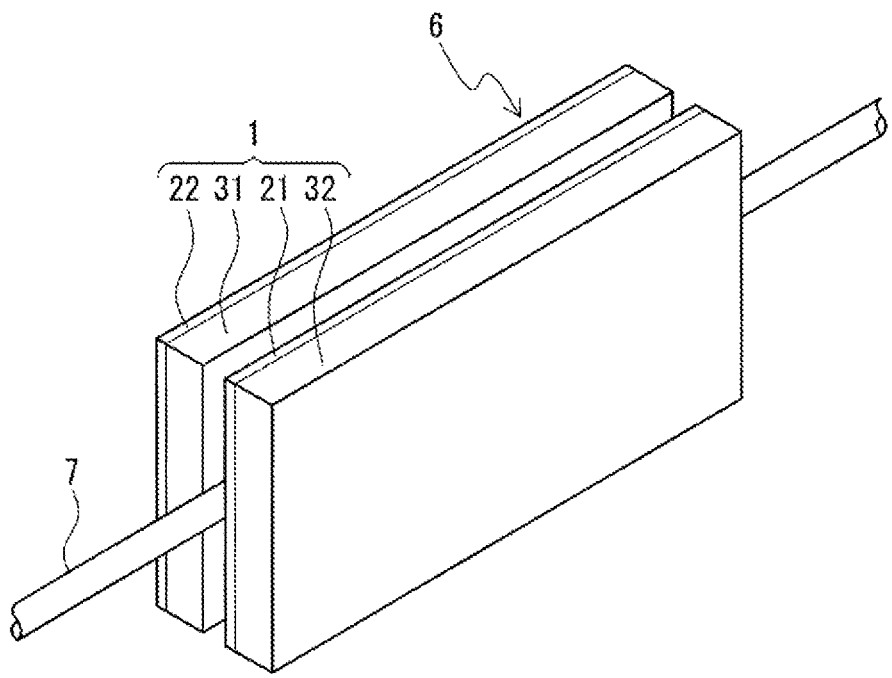
FIG. 4 is an external perspective view showing an example of a wiring harness with acoustic insulator of the present invention.

FIG. 4 is an external perspective view showing an example of a wiring harness with acoustic insulator. As shown in FIG. 4, a wire harness with acoustic insulator 6 is a combination example of the acoustic insulator 1 shown in FIG. 3 and a wiring harness 7. The wire harness with acoustic insulator 6 is an integrated assembly of the acoustic insulator 1 and the wiring harness 7. The wiring harness 7 is integrated with a part thereof sandwiched between the first base material non-woven fabric 31 and the first skin material non-woven fabric 21 of the acoustic insulator 1.

A fixed position of the wiring harness 7 in the wire harness with acoustic insulator 6 is not particularly limited to the above position. The wiring harness 7 may be arranged at any position of the non-woven fabric laminate constituting the acoustic insulator 1. In the case of sandwiching the wiring harness by non-woven fabrics so that the wiring harness is located in the non-woven fabric laminate of the acoustic insulator in this way, a shock absorbing effect by the non-woven fabrics is obtained.

The wiring harness 7 may be a wiring harness in which a wire bundle formed by bundling a plurality of wires, in each of which a core is covered around by an insulator, is covered around by a wiring harness protecting member. The wiring harness 7 is not particularly limited to the above configuration and may be composed of only one wire or a plurality of wires may be bundled by a tying member or the like without using the wiring harness protecting member.

A method for bonding the above wiring harness protecting member or the like and the acoustic insulator via an adhesive is cited as a means for fixing and integrating the wiring harness 7 to and with the acoustic insulator 1. Further, if the wiring harness 7 is sandwiched between the non-woven fabrics 31, 21 as shown in FIG. 4, it is also possible to thermally fuse the wiring harness protecting member and the non-woven fabrics. Further, although not particularly shown, the wiring harness 7 may be fixed to and integrated with the acoustic insulator 1 using a separate mounting member or the like. The wiring harness 7 may be fixed to any of the first skin material non-woven fabric 21, the second skin material non-woven fabric 22, the first base material non-woven fabric 31 and the second base material non-woven fabric 32.

Figure 5:
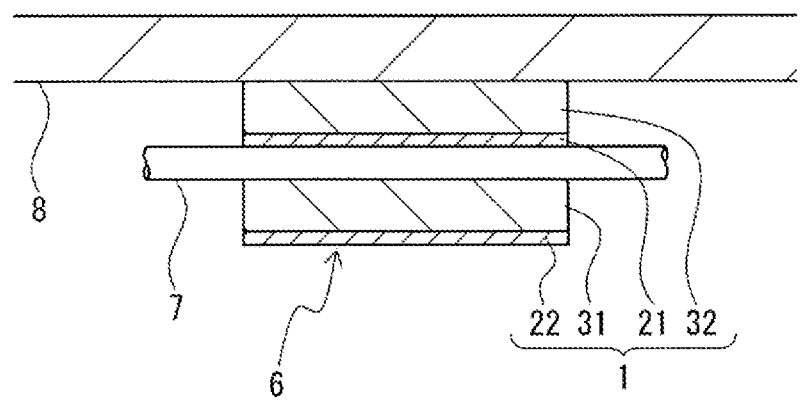
FIG. 5 is a section showing a state where the wiring harness with acoustic insulator is mounted on a vehicle body.

FIG. 5 is a section showing a state where the wire harness with acoustic insulator is mounted on a vehicle body. As shown in FIG. 5, the wire harness with acoustic insulator 6 is fixed in a state where one surface of the acoustic insulator 1 is in contact with a vehicle body 8. An upward direction in FIG. 5 is a direction toward a sound source such as an engine compartment and a downward direction in FIG. 5 is a direction toward vehicle interior. To mount the acoustic insulator 1 on the vehicle body 8, either the wiring harness 7 or the acoustic insulator 1 or both the wiring harness 7 and the acoustic insulator 1 can be fixed to a supporting member (not shown) installed on the vehicle body 8.

The acoustic insulator 1 or the wire harness with acoustic insulator 6 can be installed at a position where it is desired to cut noise such as between an engine compartment and the vehicle interior of an automotive vehicle, e.g. in a dashboard of the automotive vehicle.

The acoustic insulator of the present invention can be suitably used as an acoustic insulator for vehicle such as automotive vehicle. The wire harness with acoustic insulator of the present invention can be suitably used as a wiring harness for automotive vehicle.

EXAMPLES

Examples of the present invention and Comparative Example are described below.

Examples 1 and 2, Comparative Example

Figure 6:
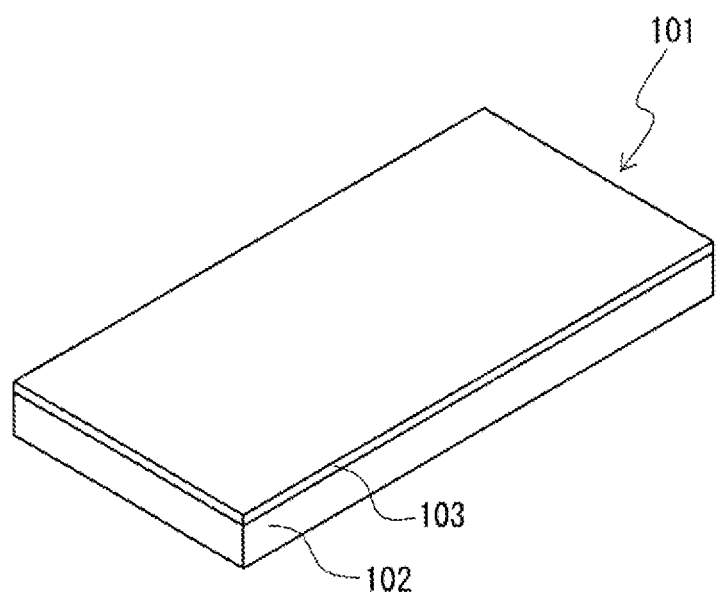
FIG. 6 is an external perspective view showing a material of Comparative Example.
Figure 7:
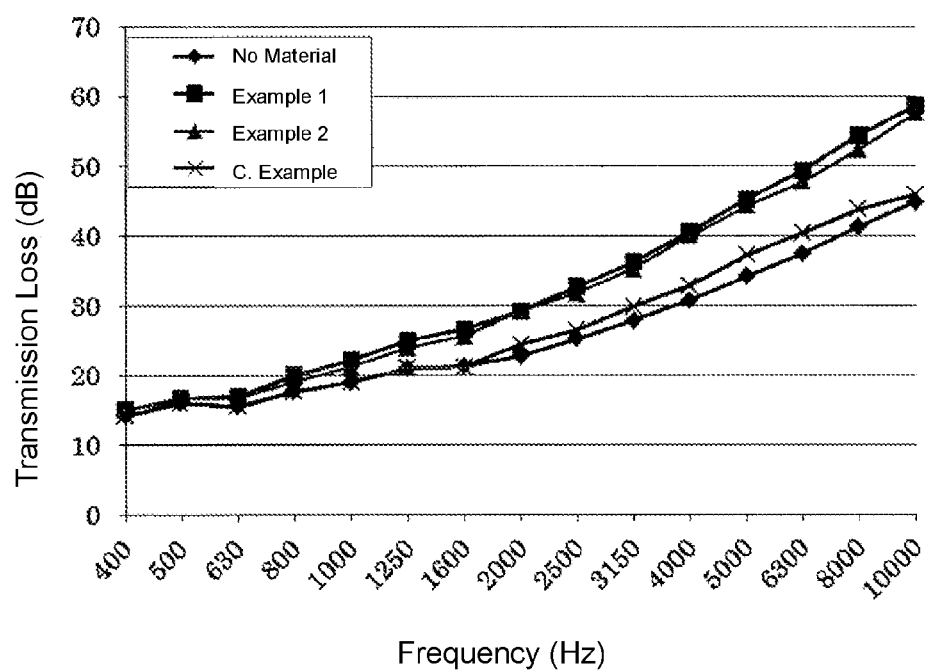
FIG. 7 is a graph showing a measurement result of acoustic insulation performance of Examples.

An acoustic insulator of Example 1 had a four-layer laminate structure composed of the base material non-woven fabric 32, the skin material non-woven fabric 21, the base material non-woven fabric 31 and the skin material non-woven fabric 22 as shown in FIG. 3. Further, an acoustic insulator of Example 2 had a three-layer laminate structure composed of the base material non-woven fabric 32, the skin material non-woven fabric 2 and the base material non-woven fabric 31 as shown in FIG. 1. Further, as shown in FIG. 6, an acoustic insulator 101 of Comparative Example used a laminate in which a skin material non-woven fabric 103 is laminated on a base material non-woven fabric 102. Acoustic insulation performance was measured in accordance with JIS A 1411-1 for Examples 1 and 2 and Comparative Example. A measurement result of the acoustic insulation performance is shown in FIG. 7. The configurations and acoustic insulation performance test method of the acoustic insulators of Examples and Comparative Example are as follows.

The arrangement of the non-woven fabrics from a sound source side is as follows in each acoustic insulator.

Example 1: skin material non-woven fabric (1 mm in thickness)/base material non-woven fabric (10 mm in thickness)/skin material non-woven fabric (1 mm in thickness)/base material non-woven fabric (10 mm in thickness), 22 mm in total thickness Example 2: base material non-woven fabric (10 mm in thickness)/skin material non-woven fabric (1 mm in thickness)/base material non-woven fabric (10 mm in thickness), 21 mm in total thickness Comparative Example 1: skin material non-woven fabric (1 mm in thickness)/base material non-woven fabric (10 mm in thickness), 11 mm in total thickness The skin material non-woven fabric(s) and the base material non-woven fabric(s) were bonded and integrated into an acoustic insulator at 180° C. after being laminated.

[Skin Material Non-Woven Fabric]

Type of fibers: polyolefin long fibers, 4 μm in fiber diameter

Fabrication method: fabricated by needle punching or spun bonding

Basis weight: 50 g/m$^2$

Thickness: 1 mm

[Base Material Non-Woven Fabric]

Type of fibers: polyester short fibers, 20 μm in fiber diameter

Fabrication method: fabricated by needle punching or spun bonding

Basis weight: 300 g/m$^2$

Thickness: 10 mm

[Acoustic Insulation Performance Measurement Method]

Figure 8:
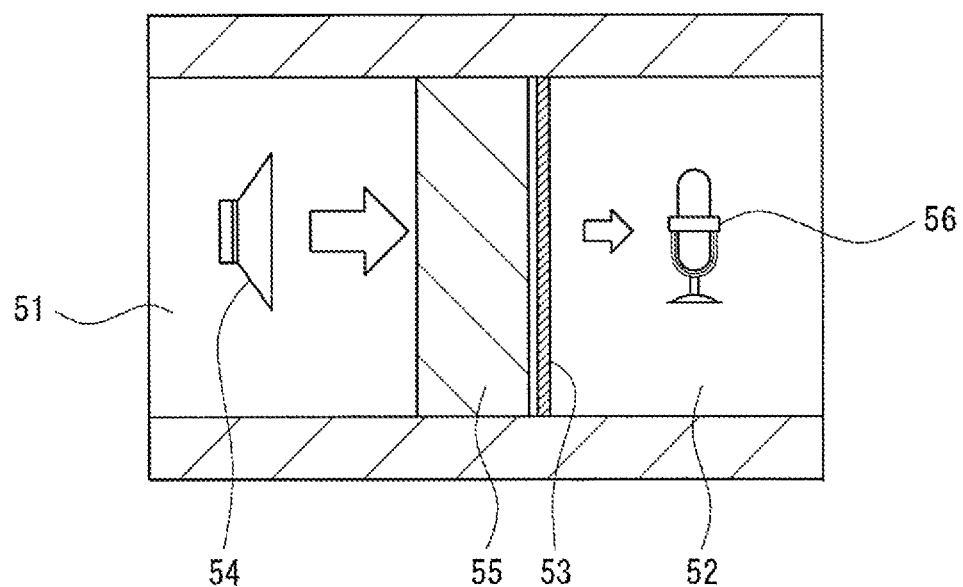
FIG. 8 is a diagram showing a measurement method for measuring an acoustic transmission loss.

Acoustic insulation performance was measured by a test in accordance with JIS A 1441-1 and evaluated based on a value of an acoustic transmission loss. In the test, the acoustic transmission loss was measured by partitioning between a reverberant chamber 51 serving as a sound source chamber and an anechoic chamber 52 serving as a sound receiving chamber by a resin plate 53 (t=1 mm) and arranging the acoustic insulator (sample 55) of Example or Comparative Example in the reverberant chamber 51 as shown in FIG. 8. A sound pressure (transmitted sound) was measured by arranging a speaker 54 serving as a sound source to generate sound waves (incident sound) in the reverberant chamber 51 and arranging a microphone 56 for measuring a sound pressure level of sound (transmitted sound) transmitted through the sample 55 and the resin plate 53 in the anechoic chamber 52. Dimensions of test pieces (samples) of the acoustic insulator were 596 mm×596 mm in length and width. The value of the acoustic transmission loss was obtained from the following equation (2) by measuring the sound pressure level of the transmitted sound in relation to the sound pressure level of the incident sound. The measurement was conducted for cases using each of the acoustic insulators of Examples 1 and 2 and Comparative Example and a case using no acoustic insulator (no material).

The acoustic transmission loss (TL) is given by the following equation (1) as ten-fold of a common logarithm of a ratio of acoustic power ($W_1$) incident on the sample to acoustic power ($W_2$) transmitted through the sample.

$$TL = 10 \log_{10}(W_1)/(W_2) \quad (1)$$

TL can be calculated by the following equation (2), assuming that the reverberant chamber 51 is a perfect diffuse sound field and sound is transmitted to the anechoic chamber 52 only through the sample.

$$TL = SPL_0 - PWL_i + 10 \log_{10} S - 6 \quad (2)$$

TL: acoustic transmission loss [dB]
$SPL_0$: indoor average sound pressure level in reverberant chamber [dB]
$PWL_i$: indoor average sound pressure level in anechoic chamber [dB]
S: area of sample [$m^2$]

[Concerning Acoustic Transmission Loss Measurement Result]

As shown in a graph of FIG. 7, the transmission loss of the material of Comparative Example became a little larger as compared to the case using no material, but hardly changed. In contrast, it could be confirmed that the value of the transmission loss largely changed and the acoustic insulation performance was improved substantially in the entire frequency band in the case of Examples 1 and 2 as compared to the case using no material and Comparative Example.

Although the examples of the present invention have been described in detail above, the present invention is not limited to the above examples at all and various changes can be made without departing from the gist of the present invention.

For example, the acoustic insulator of the present invention may be composed of three or more base material non-woven fabrics or may be composed of three or more skin material non-woven fabrics.

The invention claimed is:

1. An acoustic insulator comprising a non-woven fabric laminate in which a plurality of non-woven fabrics are laminated, wherein:
   the non-woven fabrics include a skin material non-woven fabric and a base material non-woven fabric having a larger basis weight than the skin material non-woven fabric; and
   at least the base material non-woven fabric includes a first base material non-woven fabric and a second base material non-woven fabric and the skin material non-woven fabric is arranged between the first and second base material non-woven fabrics;
   wherein the skin material non-woven fabric has a thickness in a range of 0.1 to 3 mm; comprises fibers having a diameter in a range of 1 to 50 μm; and has a basis weight in a range of 10 to 100 g/$m^2$; and
   wherein the base material non-woven fabric has a thickness in a range of 5 to 40 mm; comprises fibers having a diameter in a range of 9 to 100 μm; and has a basis weight in a range of 100 to 600 g/$m^2$.

2. The acoustic insulator of claim 1, wherein another skin material non-woven fabric different from the skin material non-woven fabric is provided at least on one outermost surface of the non-woven fabric laminate.

3. A wiring harness with acoustic insulator, comprising the acoustic insulator one of claim 1 integrated with a wiring harness.

4. The wiring harness with acoustic insulator of claim 3, wherein the acoustic insulator and the wiring harness are integrated with the wiring harness sandwiched between the plurality of non-woven fabrics.

* * * * *